April 9, 1968  T. R. HUFF  3,376,645
DEMONSTRATION DEVICE
Filed July 7, 1965  2 Sheets-Sheet 1
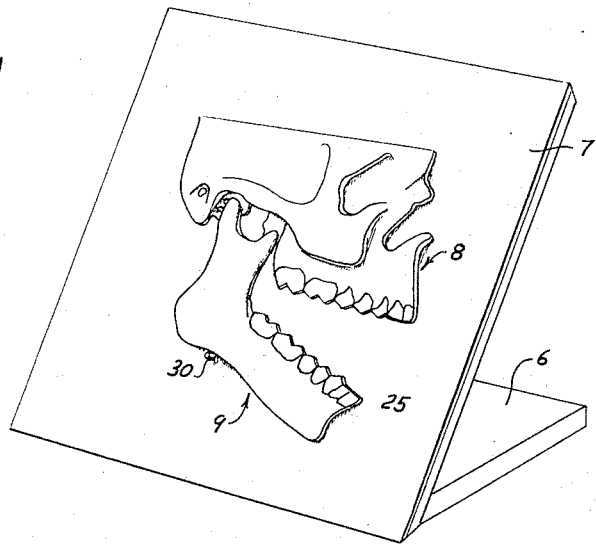
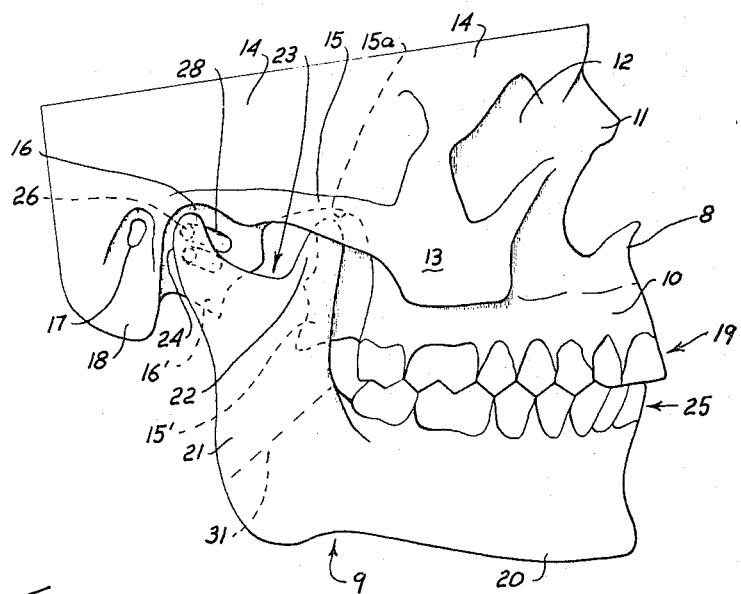
INVENTOR.
Thomas R. Huff
BY
Lynnestvedt & Lechner
ATTORNEYS

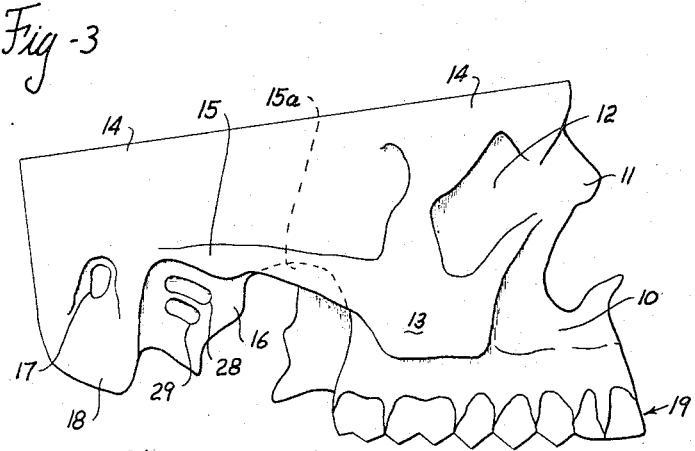
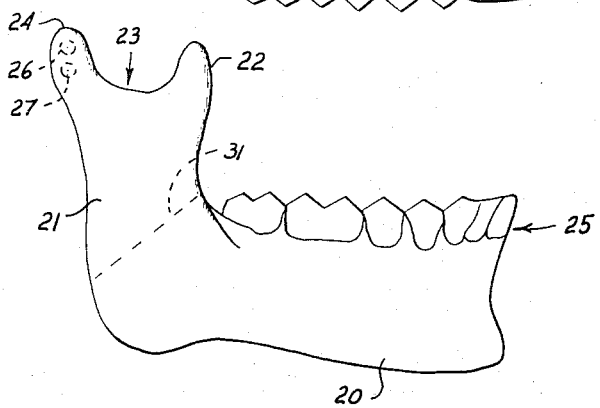
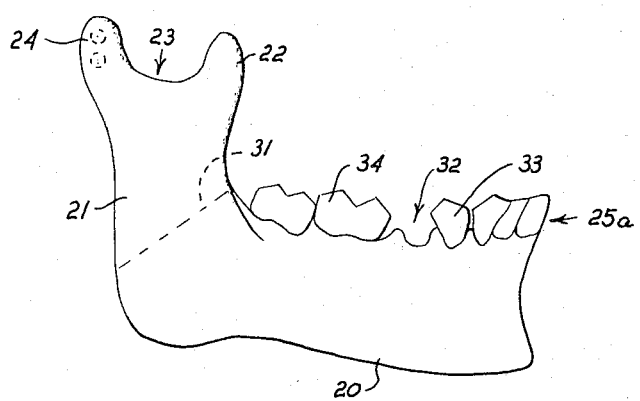

though the device of the present invention may have a variety of uses, it is especially

United States Patent Office 3,376,645
Patented Apr. 9, 1968

3,376,645
DEMONSTRATION DEVICE
Thomas R. Huff, 60 W. Chester State Road,
Paoli, Pa. 19301
Filed July 7, 1965, Ser. No. 470,134
4 Claims. (Cl. 32—71)

ABSTRACT OF THE DISCLOSURE

A demonstration device comprising bas-relief, planar facsimiles of the human upper and lower jaws and teeth in lateral aspect, with said upper facsimile fixed in position and with said lower facsimile removably mounted adjacent and substantially in the plane of the former for pivotal and fore and aft translative motion relative thereto, and with the facsimiles of the upper and lower teeth having inclined surfaces adapted to inter-engage upon closing of the facsimiles, thereby to simulate and demonstrate proper and improper human dental occlusion and to demonstrate the effects thereof on the temporomandibular joint.

---

This invention relates to a demonstration device and particularly to a device for demonstrating physiological movements of the human lower jaw structure relative to the upper jaw structure and associated bone structures of the face and skull. While the device of the present invention may have a variety of uses, it is especially suitable for use in patient instruction and education, e.g. for assisting in explaining to a patient various dental problems and related muscle and nerve problems of the jaws caused by defective or malpositioned teeth. More specifically, the demonstration device of the present invention is especially adapted for use in the explanation of problems related to improper occlusion or bite and to methods of correction thereof.

It is known that improper dental occlusion can lead to a wide variety of physiological disorders and discomforts related not only to the teeth themselves, but also to the muscle and nerve systems associated with the jaws and with other parts and organs of the head and neck, particularly including the temporomandibular joint and the auditory and balance systems. These matters are not easily understood by patients, and their explanation involves complex relationships which are difficult to grasp by laymen.

With the foregoing in mind, it is a principal object of the present invention to provide a novel, dynamic, visual demonstration device by which various malfunctions of the human jaws, and particularly with reference to problems of occlusion, can readily be explained to the patient.

It is also an object of the invention to provide a device of this type of greatly simplified form as compared with various devices heretofore proposed or employed, especially those for instruction purposes within the dental profession itself. Thus, in contrast to such prior devices which have been constructed in full three-dimensional form, the present invention contemplates the employment of facsimiles in bas-relief of the human jaw structures in which various of the three-dimensional aspects thereof are incorporated in a substantially two-dimensional form.

In accomplishing the foregoing, the present invention provides facsimiles of the lower jaw bone with its teeth (hereinafter referred to as the mandible), the upper jaw bone with its teeth (hereinafter referred to as the maxilla), and preferably, adjacent associated portions of the bone structures of the face and skull, such facsimiles constituting bas-relief structures generally representative of the above-specified human bone and tooth structures, as viewed from one exterior side thereof and as projected substantially into a plane so as to present the lateral aspect thereof in bas-relief.

In accordance with still another feature of the invention, the facsimiles of the maxilla, mandible and related bone structure of the skull and face are adapted to be mounted upon a support which preferably takes the form of a planar support disposed in a semi-upright position, the facsimile of the maxilla and associated bone structure of the skull and face being fixedly mounted upon the planar support, and the facsimile of the mandible being movably mounted thereon, so that motions of the lower jaw structure and the relation of both jaws and their teeth can readily be demonstrated.

It is a further object of the invention to provide joint means for moveably mounting the mandible facsimile relative to the maxilla facsimile so as to simulate the temporomandibular joint between the human jaws, and thus providing for motion of the mandible facsimile with respect to the maxilla facsimile to simulate the pivotal motion in the opening and closing of the jaws and also the fore and aft translative motion of the lower jaw structure.

A further aspect of the present invention is that the mandible facsimile is positioned adjacent, and is in part supported on, the planar support so that the latter serves as a guide for the pivotal and the fore and aft sliding motions of such facsimile.

A further objective of the present invention is the provision of alternative mandible facsimiles, preferably including one conforming with normal conditions of the jaws and the teeth and bite, and one or more others representative of various malformations requiring correction; provision still further being made for ready separation of joint parts between the facsimiles so that different mandible facsimiles may readily be substituted on the support and brought into demonstrative relationship to the facsimile of the maxilla, which preferably also includes the associated bone structure of the face and head, for permitting the demonstration of various proper and improper dental occlusions and related functions and malfunctions in operation of the jaws.

How the foregoing and other objects and advantages are attained will appear more fully from the following description referring to the accompanying drawings illustrating the preferred embodiment of the invention, and in which:

FIGURE 1 is a perspective view of a device constructed according to the present invention, including the planar support, with the facsimiles of the upper and lower jaws and teeth and associated portions of the bone structure of the face and skull mounted thereon;

FIGURE 2 is an enlarged view of facsimiles constructed according to the present invention, and showing the jaws closed, and also showing facsimiles with jaws and teeth of normal character to demonstrate proper occlusion;

FIGURES 3 and 4 illustrate the facsimiles shown in FIGURE 2 but with the mandible facsimile separated from the other facsimile; and FIGURE 5 is a view similar to FIGURE 4 but illustrating a mandible facsimile representative of one type of malpositioned teeth.

Referring to FIGURE 1, it will be seen that the device of the invention preferably includes a base 6 on which is mounted a support 7, in a semi-upright position, preferably in the form of a planar support and constructed, for instance, of plywood and having a well finished and dark colored surface suitable as a background against which to view the superimposed facsimiles.

The facsimile of the maxilla and associated bone structures of the face and head is indicated generally at 8 in FIGURE 1 and the mandible facsimile is indicated generally at 9. The facsimile 8 is desirably fixedly secured to the planar support 7 and the mandible facsimile is pivotally associated therewith and is also removable in the manner brought out more fully hereinafter in order to provide for substitution and for demonstration use of different mandible facsimiles.

In accordance with the invention, the facsimiles preferably comprise bas-relief structures which are generally representative of the jaws and teeth and the associated face and head bone structures as viewed from one exterior side thereof and as projected substantially into a plane to persent the lateral aspect thereof, but still retaining a bas-relief effect to a thickness or depth something of the order of width of the teeth. This can be seen in the perspective view of FIGURE 1.

Although a device constructed according to the invention may include substantially no more than facsimiles of the upper and lower jaw bones together with their associated teeth, it is preferable to include with the facsimile of the maxilla, a facsimile of various of the bone structures of the face and skull which are associated with the jaws, and which in nature have nerve, muscle and sensory functions associated therewith that may be physiologically affected by improper dental occlusion. Such facial and skull bone structures include those designated below with reference to FIGURE 2.

As shown in FIGURE 2, the upper facsimile includes representations of the upper jaw bone as indicated at 10 with its associated teeth 19, and preferably also includes representations of the external nose bones 11, the orbit or eye socket 12, the malar or cheek bone 13, portions of the cranium 14, the zygomatic arch 15, the pterygoid process 15', the glenoid fossa 16, the styloid process 16', the external auditory meatus or ear canal 17, and the mastoid region 18. In such facsimile the maxillary teeth 19 are represented in a simplified sawtooth pattern but do not include all of the normal maxillary teeth. For example, in the maxilla facsimile 8 as illustrated, the third maxillary molar is omitted.

The facsimile of the lower jaw structure preferably includes representations of the body 20 of the lower jaw bone, the ramus 21, the coronoid process 22, the coronoid notch 23, and the condyle 24. The mandibular teeth are generally indicated at 25, and here again are represented in a somewhat simplified sawtooth pattern as projected into the plane of the facsimile, and the total number of teeth is less than normal. The omission of certain teeth in both facsimiles constructed in accordance with this invention is desirable because of the projection of the curvature of the jaws and teeth substantially into a plane, thereby shortening the available space to accommodate all the teeth. By omitting certain teeth in the facsimiles, the size of the remaining teeth appears to the eye to retain a better proportionate relation to the size of the jaw bones and the associated head and facial bone structures.

As will be seen from FIGURES 2, 3 and 4, for the purpose of moveably mounting the mandible facsimile relative to the maxilla facsimile to simulate the natural temporomandibular joint between the jaws, a pair of pivot pins 26, 27 are arranged to project from the inner side of the portion of the mandible facsimile representing the condyle 24, and a cooperating pair of pin-receiving arcuate slots 28, 29 are provided in the facsimile representation of the glenoid fossa 16. A suitable but simpler joint may be provided by employing a single pin and slot combination of similar construction. Such pin or pins and arcuate slot or slots constitute joint or pivot parts which are separable in a direction perpendicular to the general plane of the two facsimiles, so that the mandible facsimile may readily be applied to and removed from the other.

As shown in FIGURE 1, the planar support 7 is preferably inclined somewhat from the vertical so that with the maxilla facsimile 8 fixedly mounted on the support 7, and with the pins 26, 27 projecting inwardly from the mandible facsimile 9 and inserted into the slots 28, 29 (see FIGURE 2), the planar support partially supports the mandible facsimile and serves as a guide for the pivotal and fore and aft sliding motions thereof relative to the maxilla facsimile. With this arrangement, the effect of gravity assists in retaining the mandible facsimile in assembled relation with the maxilla facsimile and also permits the lower jaw to open roughly within anatomical limits under the gravitational effect. As shown in FIGURE 1, a pin 30 projecting from the mounting face of the support 7 is positioned to limit the opening of the jaw to a generally naturally open position.

In the facsimiles 8 and 9, the upper and lower teeth 19 and 25 and the associated jaw bone structures are of substantially the same thickness, as will appear from inspection of FIGURE 1, so that when the mandible facsimile is positioned against the planar support 7, and pivotally mounted on the other facsimile, the teeth 25 will lie in the same plane as the teeth 19. As shown in FIGURES 2, 3 and 4, portions of the mandible facsimile (upwardly from approximately the reference line 31 as seen in FIGURE 2) representing the ramus, coronoid process and the condyle are cut away or molded to a thickness less than that of the body 20 of the lower jaw bone and the teeth 25, so that those portions of the mandible facsimile may readily overlie areas of the glenoid fossa and the pterygoid process in the other facsimile. As best seen in FIGURES 2 and 3, the facsimile representation of the zygomatic arch is hollowed out as indicated by the dotted line 15a in order to accommodate the coronoid process 22 when the jaws are in closed position. Similarly, the maxillary incisors are hollowed out on their underside to accommodate the mandibular incisors when the jaws are in the fully closed position as shown in FIGURE 2. By such interfittings of parts and by the guiding action of the planar support 7, the mandible facsimile is maintained in substantially the same mean plane as the maxilla facsimile, thus facilitating the desired illustration and demonstration of the action and effects of proper and improper occlusion.

The joint or pivot elements 26, 27, 28 and 29 provide for pivotal motion of the mandible facsimile to simulate opening and closing of the jaws and teeth, and the arcuate shape of the slots 28, 29 provides for fore and aft translative motion of the mandible facsimile relative to the facsimile of the upper jaw and teeth and the associated facial and head bone structures, thus simulating the motions as permitted in nature by the temporomandibular joint. The type of pivot joint described herein is not intended to represent accurately the natural structure of the jaws which controls and establishes the jaw motions. Actually, the natural physiological movements of the lower jaw are determined by the muscles and ligaments associated with the temporomandibular joint, limited by the shape of the glenoid fossa and condyle, and also limited by the inclined planes or surfaces of the teeth themselves, which with a normal bite or occlusion tend to interdigitate in the manner simulated by the teeth in the facsimiles as shown in FIGURE 2.

With the facsimiles described above and as shown in FIGURES 1 through 4, the operator is enabled to demonstrate dynamically normal occlusion and the physiological effects thereof on the temporomandibular joint and associated parts and organs in the face, head and neck.

By substituting alternative mandible facsimiles representing various malformations of the mandibular teeth, it is also possible to demonstrate with the device of this invention other conditions including conditions of improper bite or occlusion, the effects thereof and recommended correction therefor. For example, as seen in FIGURE 5, a mandible facsimile is provided similar to that illustrated in FIGURE 4 but incorporating teeth, indicated generally at 25a, from which a second pre-molar has been removed at the position indicated at 32. As frequently occurs, the extraction of such a tooth tends to cause one or more of the adjacent teeth, such as indicated at 33 and 34, to become tilted or tipped somewhat from their normal position, and in some instances to be somewhat separated from the adjacent teeth. With the mandible facsimile shown in FIGURE 5 applied to the device in place of the facsimile 9 as shown in FIGURE 1, the improper bite resulting from the extraction and from the consequent drift and/or tilt of adjacent teeth can readily be demonstrated when the alternative mandible facsimile is brought into engagement with the maxilla facsimile shown in FIGURE 1.

With a mandible facsimile such as shown in FIGURE 5, the device of the present invention can also be used to demonstrate the action of the inclined surfaces of the teeth, in cases of improper bite or occlusion, causing the lower jaw structure to shift or skid fore or aft upon closing the jaws, depending upon the points at which the teeth in the upper and lower jaws inter-engage. The device as so employed also permits demonstration of the cause of pain or strain in the muscles and ligaments supporting the temporomandibular joint upon abnormal or extensive sliding or shifting of the lower jaw structure as caused by improper occlusion. The pin and slot construction described hereinabove for moveably mounting the mandible facsimile relative to the maxilla facsimile permits the operator to demonstrate both normal and abnormal movements of the jaw structures and to demonstrate the effects on the temporomandibular joint of defective or malpositioned teeth.

The bas-relief, substantially planar facsimiles provided by the present invention permit the employment of a joint between the jaw facsimiles which is of simple form but which effectively simulates the temporomandibular joint and the compound motions of the lower jaw permitted thereby. As will be seen from FIGURE 1, with a mandible facsimile supported on the planar support and pivotally mounted on the other facsimile as described hereinabove, motions of the mandible facsimile, both pivotal and translative, relative to the other facsimile, may be readily effected by the application of pressure thereto through the thumb or fingers of the operator.

The facsimiles according to the present invention may be formed, as by molding or casting, of rigid resin material such as self-curing methyl methacrylate resin, and preferably containing a light colored pigment which, when the facsimiles are assembled on the dark background of the planar support, provide good contrast and thus provide for effective demonstration of the jaw motions.

Variations of the invention, within the scope of the appended claims, will occur to those skilled in the art. For example, a pair of maxilla facsimiles may be mounted on a single planar support with variations in the arrangement of the teeth thereof and may be used in conjunction with similar or different mandible facsimiles to demonstrate in such a multiple application of the invention a variety of proper and improper occlusion and bite conditions.

I claim:

1. A demonstration device, comprising a facsimile of the human upper jaw bone with teeth (maxilla) and constituting a structure generally representative of the maxilla as viewed from one exterior side thereof and as projected substantially into a plane so as to present the lateral aspect thereof in bas-relief, a facsimile of the human lower jaw bone with teeth (mandible) and constituting a structure generally representative of the mandible as viewed from the same exterior side and as projected substantially into a plane so as to present the lateral aspect thereof in bas-relief, the facsimiles of both the maxillary teeth and the mandibular teeth having a depth approximately the width of human teeth, proportioned to the scale of the facsimiles, with the facsimile teeth being projected into the general plane of the facsimiles in a simplified sawtooth pattern and having inclined surfaces adapted to interengage upon closing of said maxilla and mandible facsimiles thereby to simulate in one plane human dental occlusion, said mandible facsimile being positioned generally in the plane of and adjacent said maxilla facsimile, and joint means mounting said mandible facsimile relative to said maxilla facsimile providing for the opening and closing motions of the facsimiles and thus simulating opening and closing motions of the human mandible relative to the human maxilla, and further providing for fore and aft translative motions of the mandible facsimile relative to the maxilla facsimile under the influence of interengagement of the sawtooth surfaces of the teeth of the facsimiles and thus simulating in one plane translative motions of the human mandible relative to the human maxilla.

2. A device according to claim 1 and further including a planar support for the facsimiles, the maxilla facsimile being fixedly mounted on the support in a plane parallel to the plane of the support and the mandible facsimile being positioned adjacent to and in the same general plane as the maxilla facsimile, and the joint means including interengageable and separable pivot means for interconnecting the facsimiles, the pivot means being separable by displacing the mandible facsimile in a direction away from the plane of said support, and the support being inclined from the vertical in a direction providing for maintenance of interengagement of the pivot means under the action of gravity.

3. A device according to claim 1, in which said joint means interconnects said maxilla and mandible facsimiles and comprises separable pivot parts providing for removal of said mandible facsimile from interconnection with said maxilla facsimile and permitting replacement thereof with another mandible facsimile having pivot parts adapted to cooperate with said pivot parts of said maxilla facsimile for effecting interconnection thereof, thereby providing for demonstration of differently formed mandible facsimiles with relation to said maxilla facsimile.

4. A device according to claim 1, in which said maxilla facsimile is fixed in position, and with said mandible facsimile removeably positioned relative to said fixed maxilla facsimile.

References Cited

UNITED STATES PATENTS

| 1,166,796 | 1/1916 | Weisse | 32—71 |
| 1,530,235 | 3/1925 | Chayes | 32—71 |
| 1,682,904 | 9/1928 | Hanav | 32—71 |
| 2,118,092 | 5/1938 | Loeffel et al. | 35—17 |
| 2,576,569 | 11/1951 | Burtenshaw | 32—71 |

RICHARD A. GAUDET, *Primary Examiner.*

J. HINEY, *Assistant Examiner.*